United States Patent
Ruckwied et al.

(10) Patent No.: US 8,615,991 B2
(45) Date of Patent: Dec. 31, 2013

(54) DEVICE FOR REDUCING CORROSIVE CONSTITUENTS IN AN EXHAUST GAS CONDENSATE OF AN INTERNAL COMBUSTION ENGINE

(75) Inventors: Jens Ruckwied, Stuttgart (DE); Wolfgang Knoedler, Waiblingen (DE); Klaus Irmler, Tuebingen (DE); Joerg Werner, Markgroningen-Unterriexingen (DE)

(73) Assignee: Behr GmbH & Co. KG, Stuttgart (DE)

(*) Notice: Subject to any disclaimer, the term of this patent is extended or adjusted under 35 U.S.C. 154(b) by 239 days.

(21) Appl. No.: 13/084,828

(22) Filed: Apr. 12, 2011

(65) Prior Publication Data

US 2011/0247320 A1    Oct. 13, 2011

(30) Foreign Application Priority Data

Apr. 12, 2010 (DE) .......................... 10 2010 003 864

(51) Int. Cl.
*F01N 3/02* (2006.01)

(52) U.S. Cl.
USPC .................. 60/309; 60/278; 60/279; 60/298; 60/320; 60/321; 123/568.11; 123/568.15; 123/568.17

(58) Field of Classification Search
USPC ........... 60/274, 278, 279, 298, 299, 309, 320, 60/321, 322; 123/568.11, 568.12, 568.15, 123/568.16, 568.17
See application file for complete search history.

(56) References Cited

U.S. PATENT DOCUMENTS

| | | | |
|---|---|---|---|
| 7,478,630 B2* | 1/2009 | Maucher et al. ......... | 123/568.12 |
| 7,866,305 B2* | 1/2011 | Geskes et al. ............ | 123/568.12 |
| 7,882,827 B2* | 2/2011 | Grunenwald et al. ... | 123/568.12 |
| 8,272,371 B2* | 9/2012 | Fasold et al. ............. | 123/568.12 |
| 2001/0047861 A1* | 12/2001 | Maeda et al. ............... | 165/167 |
| 2005/0188965 A1* | 9/2005 | Usui ....................... | 123/568.12 |

* cited by examiner

*Primary Examiner* — Binh Q Tran
(74) *Attorney, Agent, or Firm* — Muncy, Geissler, Olds & Lowe, PLLC (57) ABSTRACT

A device for reducing corrosive constituents in an exhaust gas condensate of an internal combustion engine is provided, in which the exhaust gas of the internal combustion engine is recirculated to the internal combustion engine via an exhaust gas recirculation system having an exhaust gas cooler and at least one exhaust gas recirculation line. To protect the exhaust gas recirculation system along with intake air components and the internal combustion engine from the corrosive effects of the exhaust gas condensate, the exhaust gas recirculation system has at least one neutralization unit for neutralizing the corrosive constituents of the exhaust gas condensate, which is connected to at least one component arranged downstream, through which the exhaust gas, which has been freed of nearly all corrosive constituents, flows.

18 Claims, 7 Drawing Sheets

Table H:

Solubility in water [g/l H₂O] at 20°C

|  | Aluminum | Zinc |
|---|---|---|
| Sulfate | 630 Al2(SO$_4$)$_3$ | 965 ZnSO$_4$-7H$_2$O |
| Nitrate | 419 Al(NO$_3$)$_3$-9H$_2$O | 5680 Zn(NO$_3$).6H$_2$O |

Fig. 7

DEVICE FOR REDUCING CORROSIVE CONSTITUENTS IN AN EXHAUST GAS CONDENSATE OF AN INTERNAL COMBUSTION ENGINE

This nonprovisional application claims priority under 35 U.S.C. §119(a) to German Patent Application No. DE 10 2010 003 864.4, which was filed in Germany on Apr. 12, 2010, and which is herein incorporated by reference.

BACKGROUND OF THE INVENTION

1. Field of the Invention

The invention relates to a device for reducing corrosive constituents in an exhaust gas condensate of an internal combustion engine, in which the exhaust gas of the internal combustion engine is recirculated to the internal combustion engine via an exhaust gas recirculation system, having an exhaust gas cooler and at least one exhaust gas recirculation line.

2. Description of the Background Art

In components for conducting exhaust gas, particularly exhaust gas coolers and charge-air coolers in low-pressure exhaust gas recirculation systems, corrosive exhaust gas condensate is produced when the temperature drops below the dew point. This corrosive exhaust gas condensate can produce corrosive effects in the components downstream and in the combustion engine itself, resulting in damage to or even failure of the components or the internal combustion engine, which come into contact with the corrosive exhaust gas condensate.

When condensate forms, strong acids are produced, which have a corrosive effect on the metallic surfaces of the exhaust gas recirculation system or the internal combustion engine.

EP 2 161 438 A2 describes a system for recirculating exhaust gas of an internal combustion engine, which has a separator unit. This separator unit separates condensate, and the condensate that is separated from the exhaust gas is discharged partially to a low pressure part of the exhaust gas system via a disposal line. Also provided is a metering unit, which introduces a definable amount of the condensate or at least of the components of the condensate into an air supply inlet channel of the combustion cylinder of the internal combustion engine.

From DE 10 2005 047 840 A1, which corresponds to U.S. Publication No. 20070261400, an air-cooled exhaust gas heat exchange system is known, in which channels for conducting the exhaust gas are embodied as tubes. Between the channels, ribs are arranged for air cooling, which are made of stainless steel and are therefore protected against corrosion.

DE 10 2005 059 717 A1, which corresponds to U.S. Publication No. 20080190403, and which describes a heat exchange device for acid-containing gases. The device comprises a heat exchanger having at least one flow channel for the acid-containing gas, which channel is made substantially of aluminum and/or an aluminum alloy and is embodied in such a way that the flow channel is protected against deep corrosion caused by the acid-containing gas, resulting in a uniform protection of components.

SUMMARY OF THE INVENTION

It is therefore an object of the present invention to provide a device for reducing corrosive constituents in an exhaust gas condensate of an internal combustion engine, in which the components of the exhaust gas recirculation system and/or the intake air components and the internal combustion engine are protected against the corrosive effects of the exhaust gas condensate, whereby the device can also be easily produced.

According to an embodiment of the invention, the problem is solved in that the exhaust gas recirculation system comprises at least one neutralization unit for neutralizing the corrosive constituents of the exhaust gas condensate, which unit is connected to at least one component arranged downstream, through which the exhaust gas, which has been nearly freed of corrosive constituents, flows. This offers the advantage that the neutralization unit produces a constant and targeted neutralization of the corrosive components of the exhaust gas condensate, thereby protecting the components of the exhaust gas recirculation system that lie downstream, the intake air components and/or the internal combustion engine itself against corrosion and mechanical wear caused by the corrosive particles.

The neutralization unit, in a region through which the exhaust gas flows, can have a surface made of a material that reacts chemically with the corrosive constituents of the exhaust gas condensate. The chemically reactive material chemically bonds with the acid constituents of the exhaust gas condensate and removes them from the region of the chemically reactive material. This chemical reaction of the corrosive constituents with the material takes place directly at the site where the condensate forms, or as close as possible downstream thereof. The resulting reaction products do not settle on the surface of the neutralization unit, therefore allowing subsequent exhaust gas condensate access to the reactive surface of the neutralization unit.

In another embodiment, the neutralization unit can be produced entirely from the material which reacts chemically with the corrosive constituents of the exhaust gas condensate. The reaction products produced by the chemical reaction are readily soluble in the liquid-containing condensate and are therefore easily transported away from the surface. The reactive surface is thus rapidly opened up for the subsequent exhaust gas condensate containing corrosive constituents. The continuous wearing away of the reactive surface allows the formation of a protective layer to be dispensed with.

In a further embodiment, the surface of the neutralization unit made of the chemically reactive material which is in contact with the exhaust gas is embodied as fine grained and can have a particle size of less than 50 μm. The small particle size results particularly in a low probability of damage to the components situated downstream in the direction of flow. As a result of the more advantageous surface to volume ratio, the reaction products are also more easily partially dissolved or dissolved in the exhaust gas condensate, wherein the corrosion products are no longer present as a solid constituent.

In one variant, the fine-grained surface of the neutralization unit is applied to a material having a coarse grain structure. Using an open-pored material, such as cast material, and applying the fine-grained surface to this coarse-grained material allows inexpensive materials to be used as the base material for the neutralization unit, resulting in a cost-effective embodiment.

In addition to neutralizing the exhaust gas, or the corrosive constituents contained in the exhaust gas condensate, the described material properties for generating very small particles represent a significant functional property of the neutralization unit.

In a variant, the material is a metallic material, preferably aluminum and alloys thereof and/or zinc and alloys thereof. Such alloys allow ready solubility of the reaction products in the exhaust gas condensate, which is achieved particularly by using alloy combinations, such as zinc alloys.

In an variant, the material includes a wrought aluminum or alloys thereof.

The chemically reactive material can include aluminum alloyed with a portion of zinc. The alloyed zinc portion makes the surface of the neutralization unit, which is in contact with the exhaust gas condensate, less noble than a purely aluminum surface, causing it to react more readily with the medium. By alloying the material with zinc, the electric potential difference between the less noble surface and the core material can be increased to greater than 70 mV. In comparison, a tubular material with zinc-free solder plating and the aforementioned aluminum core material has an electric potential difference of less than 30 mV. The higher the electric potential difference between surface and core material, the more preferable and uniform is the neutralization on the surface. In addition, deep corrosion is prevented in this manner.

In a further embodiment, the neutralization unit can be formed by at least a part of the exhaust gas cooler and/or a charge-air cooler and/or the exhaust gas recirculation line. Thus, components contained in the exhaust gas recirculation system can themselves be used as the neutralization unit. These entire components, or only parts thereof which come in contact with the exhaust gas condensate, are made of the chemically reactive material. Alternatively, these parts can simply be coated with the appropriate chemically reactive material. In this manner, a particularly cost-effective solution can be achieved.

Advantageously, the region of the neutralization unit through which the exhaust gas flows can have a small hydraulic diameter of preferably 200 mm, particularly <20 mm, in particular <6 mm, as compared with the cross-section through which the gas flows freely. The hydraulic diameter is a measurement of the amount of surface area that is used in proportion to the cross-section of the component that is used. The smaller the hydraulic diameter, the more surface area is available for reacting the exhaust gas condensate with the chemically reactive material. Therefore, to achieve a sustained reduction in the corrosive constituents of the exhaust gas condensate, the largest possible surface area must be available.

Advantageously, the region of the neutralization unit through which the exhaust gas flows has a large reactive surface area, which is preferably implemented in the form of ribs, lands or winglets.

To remove the reaction products from the region of the chemically reactive material, it is necessary for the exhaust gas condensate to have the highest possible volumetric flow rate. To achieve a high velocity gradient, the region of the neutralization unit through which the exhaust gas flows is configured such that the exhaust gas flowing through achieves Reynolds numbers of >2300, particularly as a result of installed turbulence inserts. In order for the reaction products to be removed from the reactive exhaust gas condensate, said products have the lowest possible weight and a small surface area.

In a further embodiment, the neutralization unit can be embodied as replaceable. This is advantageous particularly if the neutralization unit has only one surface that is coated with the chemically reactive material. Because this coating is consumed over time due to a limited coating thickness, it is expedient to install a new neutralization unit once this surface has been completely worn away. This will ensure that the effect of neutralizing the corrosive constituents in the exhaust gas condensate is continuously maintained.

In an embodiment, the neutralization unit can have at least one threaded and/or plug-type connection for the replaceable anchoring of the unit in the exhaust gas recirculation system. Such customary threaded or plug-type connections allow the neutralization unit to be easily replaced in the existing exhaust gas recirculation system.

A further embodiment of the invention relates to a method for reducing corrosive constituents of an exhaust gas condensate in an internal combustion engine, in which the exhaust gas of the internal combustion engine is recirculated to the internal combustion engine via an exhaust gas recirculation system, wherein, when the temperature drops below a predefined level, a corrosive exhaust gas condensate forms. To protect the internal combustion engine and the constituents of the exhaust gas recirculation system from the aggressive constituents of the exhaust gas condensate, the corrosive constituents of the exhaust gas condensate are neutralized continuously in at least one region of the exhaust gas recirculation system, wherein the exhaust gas, which has been nearly freed of the exhaust gas condensate, is recirculated to the internal combustion engine via at least one component of the exhaust gas recirculation system situated downstream. The targeted neutralization of the corrosive constituents of the exhaust gas condensate reliably protects the exhaust gas recirculation system along with the intake air components and the internal combustion engine from corrosive effects. The small particle size of the reaction products eliminates mechanical abrasion by these reaction products on the interior surfaces of the components situated downstream.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Similar features are identified by the same reference signs.

In today's vehicles, particularly in commercial vehicles, exhaust gas coolers are used for cooling recirculated exhaust gases within the framework of an exhaust gas recirculation system (EGR system). The recirculation of exhaust gas is based upon legislative regulations regarding the reduction of pollutants (particularly $NO_x$) in exhaust gases from internal combustion engines.

Figure 1:
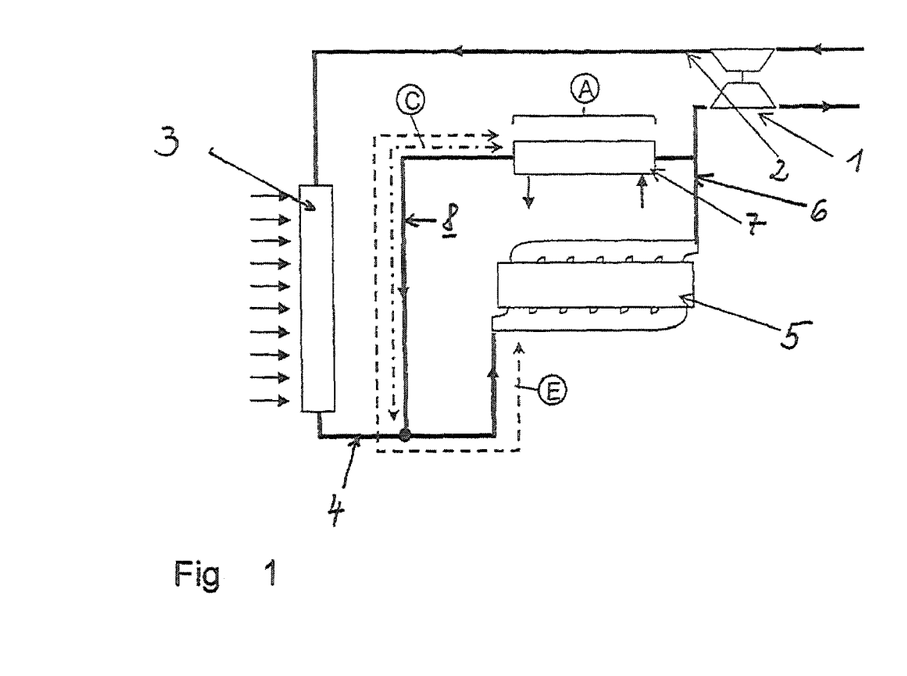
FIG. 1 illustrates a high-pressure exhaust gas recirculation system.
Figure 2:
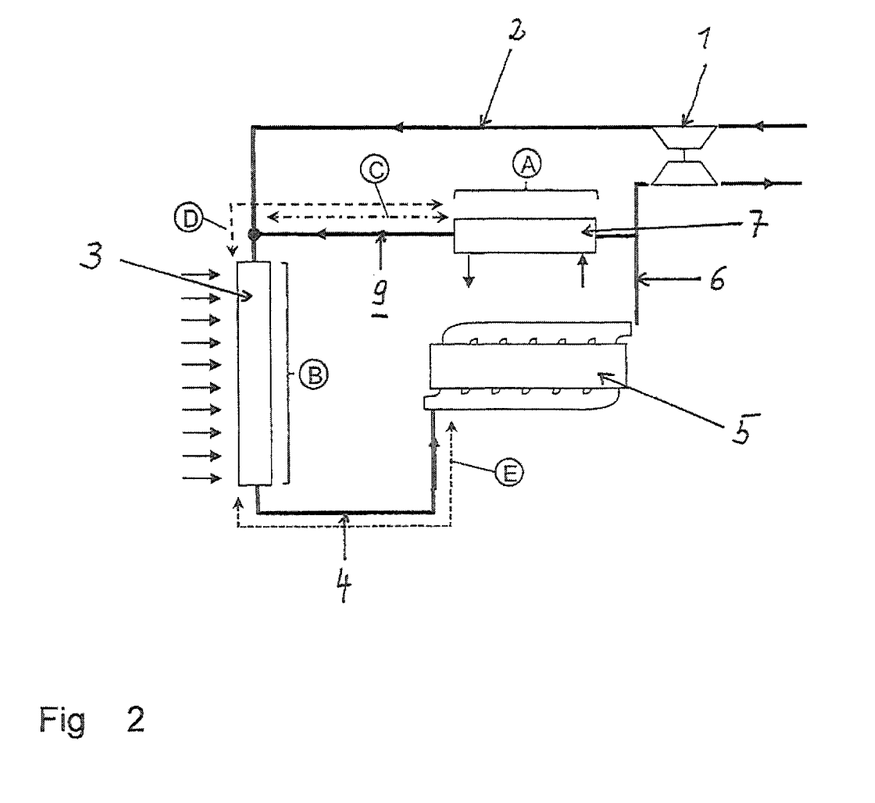
FIG. 2 illustrates a mixed exhaust gas recirculation system.
Figure 3:
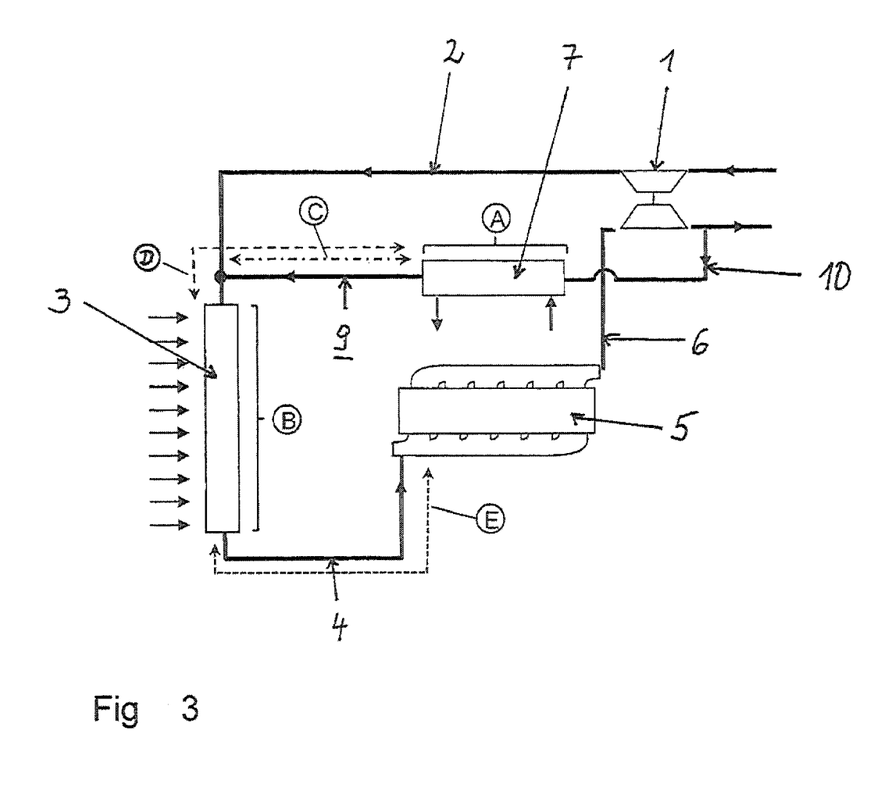
FIG. 3 illustrates a low-pressure exhaust gas recirculation system.

FIGS. 1 to 3 show an exhaust gas recirculation system for a diesel motor, which is driven by a turbocharger. The turbocharger 1 has two turbo machines, a turbine and a compressor. The turbine utilizes the energy contained in the exhaust gas to drive the compressor, which draws in fresh air and forces precompressed air into the cylinders of the diesel motor 5. The turbocharger 1 is energetically coupled to the diesel motor 5 only via the mass flow of air and exhaust gas.

In FIG. 1, the turbocharger 1 is connected via a charge-air line 2 to a charge-air cooler 3. The charge-air cooler 3 leads via a suction line 4 directly to the diesel motor 5. The diesel motor 5 is coupled again to the turbocharger 1 via an exhaust gas line 6, and to the exhaust gas cooler 7 via a branch line. The exhaust gas cooler 7 leads via a first exhaust gas recirculation line 8 to the suction line 4 of the diesel motor 5. This configuration is a high-pressure exhaust gas recirculation system.

FIG. 2 shows a similar arrangement, which represents a mixed exhaust gas recirculation system. In this illustration, as before, the turbocharger 1 is connected via the charge-air line 2 to the charge-air cooler 3, which is connected via the suction line 4 to the diesel motor 5. The internal combustion engine 5 supplies its exhaust gas to the turbocharger 1 and to the exhaust gas cooler 7 via the exhaust gas line 6. In this case, the exhaust gas cooler 7 is connected to the charge-air line 2 via a second exhaust gas recirculation line 9. In this variant, therefore, the exhaust gas condensate provided by the exhaust gas cooler 7 is supplied together with the charge air to the charge-air cooler 3, where it is cooled. This mixture of charge air and exhaust gas condensate is supplied via the suction line 4 to the diesel motor 5.

FIG. 3 shows a low-pressure exhaust gas recirculation system, in which the turbocharger 1 leads via the charge-air line 2 to the charge-air cooler 3, which is in turn connected via the suction line 4 to the diesel motor 5. The exhaust gases from the diesel motor 5 are supplied via the exhaust gas line 6 to the turbocharger 1, which discharges the exhaust gases into the environment. In contrast to the preceding FIGS. 1 and 2, in FIG. 3, the exhaust gas is fed via the third exhaust gas recirculating line 10 to the exhaust gas cooler 7, wherein the third exhaust gas recirculating line 10 is connected to the turbocharger 1 output on the side of discharge to the environment. Also in this case, the exhaust gas cooler 7 introduces exhaust gases via the second exhaust gas recirculation line 9 into the charge-air line 2, where the two are mixed and are supplied to the charge-air cooler 3 for cooling.

For all three described exhaust gas recirculation systems, there are two possible embodiments for a neutralization unit. In one embodiment, only regions of the exhaust gas recirculation system can be equipped with a coating having a material that reacts chemically with the corrosive constituents of the exhaust gas condensate. Surfaces suitable for neutralization are thereby created, which in this context have metallic materials such as zinc and alloys thereof or aluminum and alloys thereof. Ordinarily, AA7XXX (aluminum alloy with zinc portions), or zinc-containing alloys with the aluminum material groups AA4XXX (aluminum silicon), AA3XXX (aluminum manganese) or AA1XXX are used for this purpose. The chosen ratio of zinc alloy is greater than 0.5 percent by weight, preferably greater than 1%.

Alloying with zinc makes the surface less noble than a pure aluminum surface, and therefore more readily reactive with the medium. The resulting reaction products are readily soluble in the medium and are thus easily removed from the surface, thereby opening up sufficient new reactive surface. Continuous abrasion of the reactive surface without formation of a protective layer.

The ready solubility of the reaction products in the medium is achieved particularly by using the aforementioned alloy or alloy combinations, such as alloys with zinc.

Figure 7:
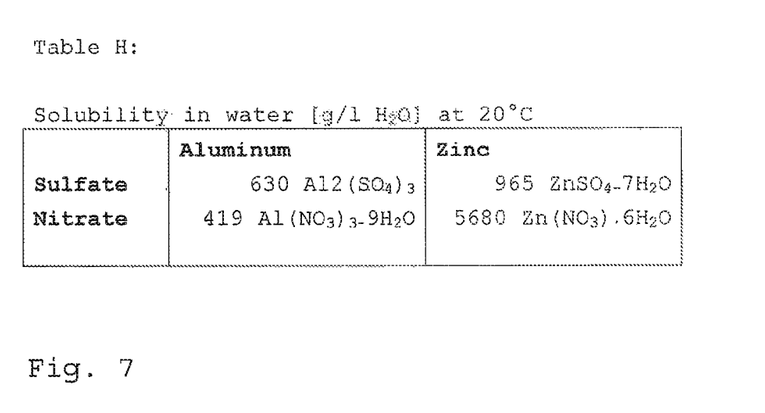
FIG. 7 is a water solubility table.

For instance, it is clear from Table H that in the exhaust gas condensate containing sulfuric acid, the solubility of zinc is 50% greater than that of aluminum (630 g/l to 965 g/l). In aqueous solutions, which result, for example, from the formation of hydroxides with OH groups, the solubility of zinc is significantly greater than that of aluminum, at 0.21 g/l to 0.0015 g/l.

The reactive surface should be as large as possible to ensure the most complete neutralization of exhaust gas condensate, and the exhaust gas recirculation lines 8, 9, 10 should be configured so as to optimize flow in order to achieve the most uniform possible impingement of the reactive surface with the exhaust gas condensate. In FIGS. 1 to 3, the regions of the exhaust gas recirculation lines 8, 9, 10 or the suction line 4 of the diesel motor 5 in question are identified by dashed arrows C, D, E.

In another variant, however, the exhaust gas cooler 7 or the charge-air cooler 3 can be produced entirely from the chemically reactive material, and can therefore serve as neutralization unit A or B.

Figure 4:
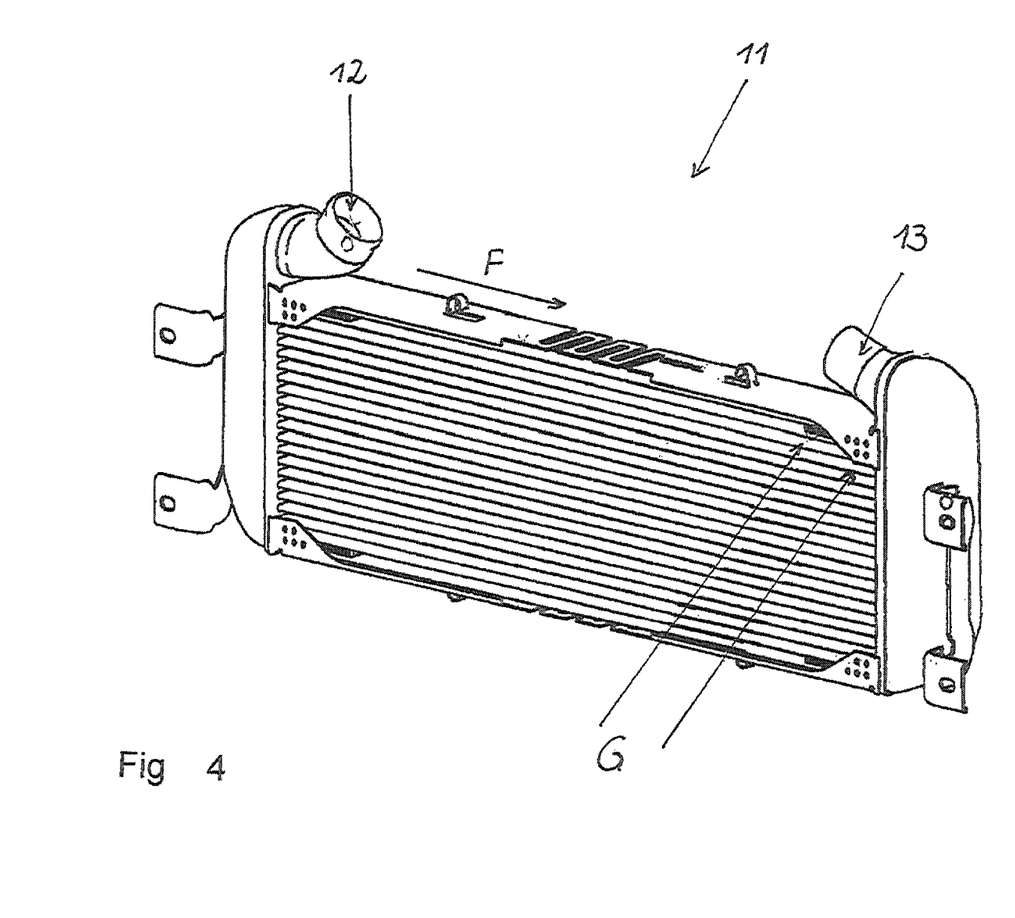
FIG. 4 illustrates an air-cooled exhaust gas neutralization unit.

FIG. 4 shows an air-cooled exhaust gas neutralization unit 11 in the form of a charge-air cooler. This air-cooled exhaust gas neutralization unit 11 has an exhaust gas intake 12 and an exhaust gas outlet 13. The exhaust gas containing a high percentage of exhaust gas condensate flows through the gas intake 12 into the exhaust gas neutralization unit 11 and is guided through the exhaust gas neutralization unit 11 along the arrow F. It then exits the exhaust gas neutralization unit 11 at the exhaust gas outlet 13. The cooling air strikes the exhaust gas neutralization unit 11 perpendicular in a cross-flow, as illustrated by the arrow G. An exhaust gas neutralization unit 11 of this type is made of aluminum or one of the above-described aluminum alloys. It serves to neutralize the corrosive constituents contained in the exhaust gas.

In the case of a cooled exhaust gas recirculation system, it is advantageous for the reactive surface to be provided in the form of the exhaust gas heat exchanger itself, as this will ensure that the condensate is largely neutralized directly at its site of formation, thereby protecting the components situated downstream.

Figure 5:
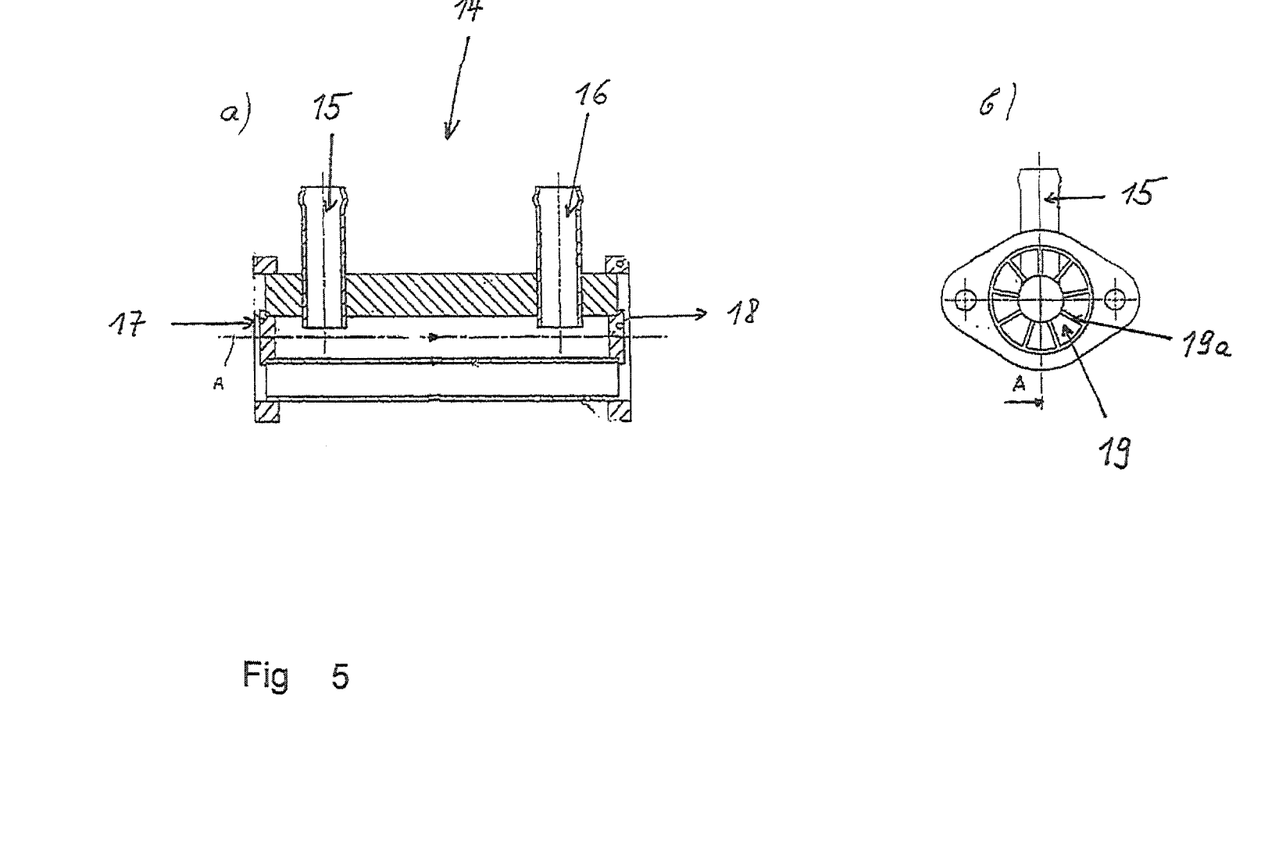
FIG. 5 illustrates an exhaust gas neutralization unit cooled with cooling water.

FIG. 5a shows an exhaust gas neutralization unit 14 which is cooled with cooling water. The cooling water flows into the cooling water-cooled exhaust gas neutralization unit 14 via the port 15 and moves along the flow direction A inside the exhaust gas neutralization unit 14, and is then discharged from the exhaust gas neutralization unit 14 via the cooling water outlet 16. The exhaust gas containing a high percentage of exhaust gas condensate flows into the exhaust gas neutralization unit 14 via the exhaust gas intake line 17, and is discharged from the exhaust gas neutralization unit 14 at the exhaust gas outlet 18.

FIG. 5b shows a cross-section of the flow channel 19 of the cooling water-cooled exhaust gas neutralization unit 14. Said cross-section has a radial geometry in the diameter of the flow channel 19. The radially extending lands 19a enlarge the surface area for reaction with the exhaust gas condensate. In the present case, the entire interior surface of the flow channel, including the radial lands, is made of aluminum or zinc or alloys thereof.

Figure 6:
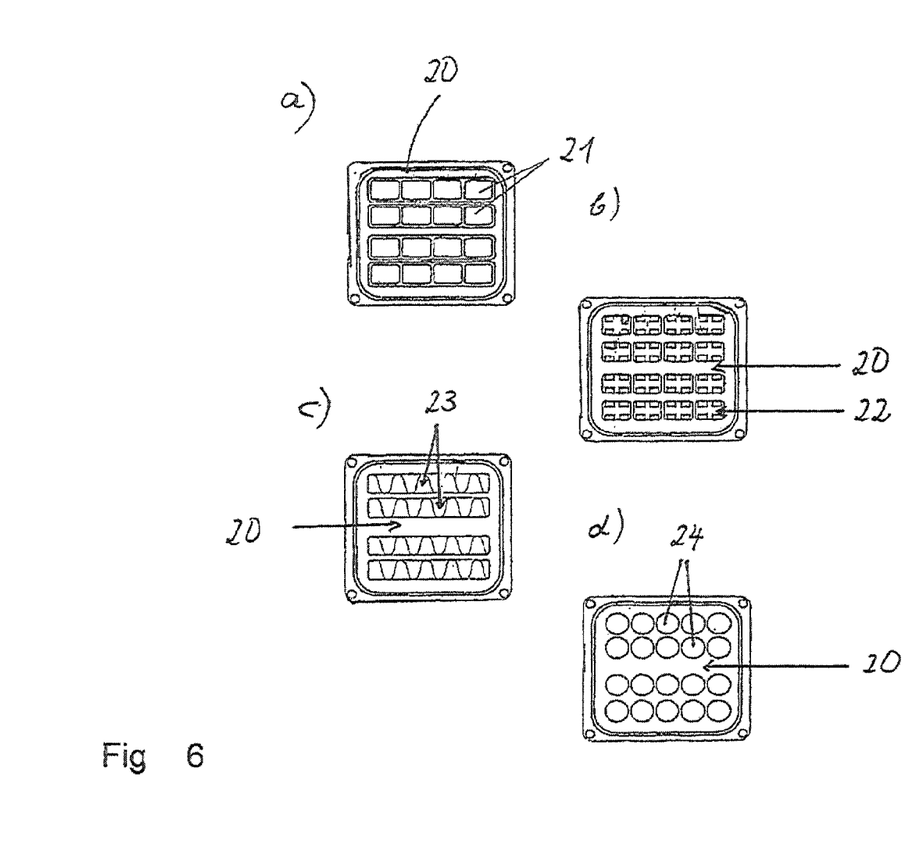
FIG. 6 illustrate various cross-sections of a flow channel of an exhaust gas neutralization unit according to FIG. 2.

FIG. 6 shows various cross-sections of another flow channel 20, which is also made of aluminum or alloys thereof, and/or zinc or alloys thereof.

FIG. 6a shows a flow channel 20 which has extruded parts 21, each of which has a rectangular cross-section and thereby forms a large surface area. Because multiple such extruded parts are arranged side by side, the exhaust gas condensate is constantly subjected to the neutralization process. The resulting reaction products are removed from the reaction region by the liquid solution which forms the exhaust gas condensate, so that subsequent exhaust gas condensate, which contains the corrosive constituents, can again react with the same surfaces.

FIG. 6b illustrates winglets 22. These are impressed areas, which ensure turbulence in the exhaust gas flow. FIG. 6c shows ribs 23, which can be produced as a rolled or stamped embodiment. This arrangement also ensures a large surface area in the flow channel 20. One particularly simple variant of the embodiment of the flow channel 20 with an enlarged surface area is illustrated in FIG. 6d, where the profiles are achieved with round tubes 24. With suitable impressions for producing a swirling effect, the surface and turbulence of these tubes can be further increased.

With the constant neutralization of the corrosive constituents of the exhaust gas condensate, which is provided in the exhaust gas cooler 7, and with the small particle size of the reaction products, which are produced by the exhaust gas condensate reacting with the chemically reactive materials, such as aluminum or an aluminum/zinc alloy, and can therefore be immediately removed from the reaction region, the components 3, 4, 8, 9, 10 downstream of the neutralization unit 7, or the diesel motor 5, can be comprehensively protected.

To allow the reaction products to be removed from the reacting exhaust gas condensate, said products have the lowest possible weight and a small surface area. If an aluminum alloy is used as the chemically reactive material, the reaction products have a weight of less than 50 μg. This small size of the direct and indirect reaction products is achieved particularly by configuring the neutralization surface of the neutralization unit A, B, C, D, E to be as homogeneous and fine-grained as possible. Indirect reaction products in this case are the material which is dissolved out in a neighboring region as a result of selective corrosion. Neutralization occurs uniformly and in a controlled manner, thereby ensuring that the reactive surface of the neutralization unit A, B, C, D, E is available over the entire lifespan of the product being used, which is achieved particularly by using the highly homogeneous, fine-grained material having the above-described particle size. In this manner, deep corrosion is reliably prevented.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for reducing corrosive constituents in an exhaust gas condensate of an internal combustion engine, in which the exhaust gas of the internal combustion engine is recirculated to the internal combustion engine via an exhaust gas recirculation system, the device comprising:
    an exhaust gas cooler;
    at least one exhaust gas recirculation line; and
    at least one neutralization unit configured to neutralize the corrosive constituents of the exhaust gas condensate, the neutralization unit being connectable to at least one component arranged downstream, through which the exhaust gas, which has been freed of nearly all corrosive constituents, flows,
    wherein at least a surface of the neutralization unit, in a region through which the exhaust gas flows, is made of a material that reacts chemically with the corrosive constituents of the exhaust gas condensate.

2. The device according to claim 1, wherein the neutralization unit is formed entirely of the material that reacts chemically with the corrosive constituents of the exhaust gas condensate.

3. The device according to claim 1, wherein the surface of the neutralization unit, which is in contact with the exhaust gas and is formed from the chemically reactive material, is embodied as fine-grained, and has a particle size of less than 50 μm.

4. The device according to claim 3, wherein the fine-grained surface of the neutralization unit is applied to a material having a coarse grain structure.

5. The device according to claim 1, wherein the chemically reactive material comprises a metallic material, aluminum and alloys thereof, and/or zinc and alloys thereof.

6. The device according to claim 5, wherein the material is a wrought aluminum or alloys thereof.

7. The device according to claim 1, wherein the surface is aluminum alloyed with a zinc portion.

8. The device according to claim 1, wherein the neutralization unit is formed by at least a part of the exhaust gas cooler and/or a charge-air cooler and/or the exhaust gas recirculation line.

9. The device according to claim 1, wherein the region of the neutralization unit, through which exhaust gas flows, has a small hydraulic diameter of 200 mm, especially <20 mm, in particular <6 mm, as compared with a cross-section through which gas flows freely.

10. The device according to claim 9, wherein the region of the neutralization unit through which exhaust gas flows has a large reactive surface, preferably in the form of ribs, lands, or winglets.

11. The device according to claim 1, wherein the neutralization unit is replaceable.

12. The device according to claim 1, wherein the electric potential difference between a less noble surface and a noble core material is greater than 30 mV, particularly greater than 70 mV.

13. The device according to claim 1, wherein the solubility of a surface in a medium containing sulfuric acid is greater than 600 g/l, preferably greater than 900 g/l, and/or the solubility thereof in aqueous solutions is greater than 0.001 g/l, particularly greater than 0.2 g/l.

14. A method for reducing corrosive constituents of an exhaust gas condensate of an internal combustion engine, in which the exhaust gas of the internal combustion engine is recirculated to the internal combustion engine via an exhaust gas recirculation system, wherein when the temperature drops below a predefined level, a corrosive exhaust gas condensate forms, the method comprising:
    performing a continuous neutralization of the corrosive constituents of the exhaust gas condensate in at least one region of the exhaust gas recirculation system via a neutralization unit having at least a surface thereof, in a region through which the exhaust gas flows, that is made of a material that reacts chemically with the corrosive constituents of the exhaust gas condensate; and
    recirculating the exhaust gas, which has been freed of nearly all exhaust gas condensate, to the internal combustion engine via at least one component of the exhaust gas recirculation system which lies downstream.

15. The device according to claim 1, wherein the chemically reactive material comprises aluminum and alloys thereof, and/or zinc and alloys thereof.

16. The device according to claim 1, wherein the neutralization unit is formed by at least a part of the exhaust gas cooler and a charge-air cooler.

17. The device according to claim 1, wherein the neutralization unit is formed by at least a part of the exhaust gas cooler, a charge-air cooler and the exhaust gas recirculation line.

18. A device for reducing corrosive constituents in an exhaust gas condensate of an internal combustion engine, in which the exhaust gas of the internal combustion engine is recirculated to the internal combustion engine via an exhaust gas recirculation system, the device comprising:
- at least one exhaust gas recirculation line; and
- at least one neutralization unit configured to neutralize the corrosive constituents of the exhaust gas condensate,
- wherein at least a surface of the neutralization unit, in a region through which the exhaust gas flows, is made of a material that reacts chemically with the corrosive constituents of the exhaust gas condensate.

* * * * *